Oct. 31, 1950     J. H. TOWNSHEND     2,527,898
BEARING PROTECTOR FOR DYNAMIC BALANCING MACHINES
Filed Oct. 19, 1948
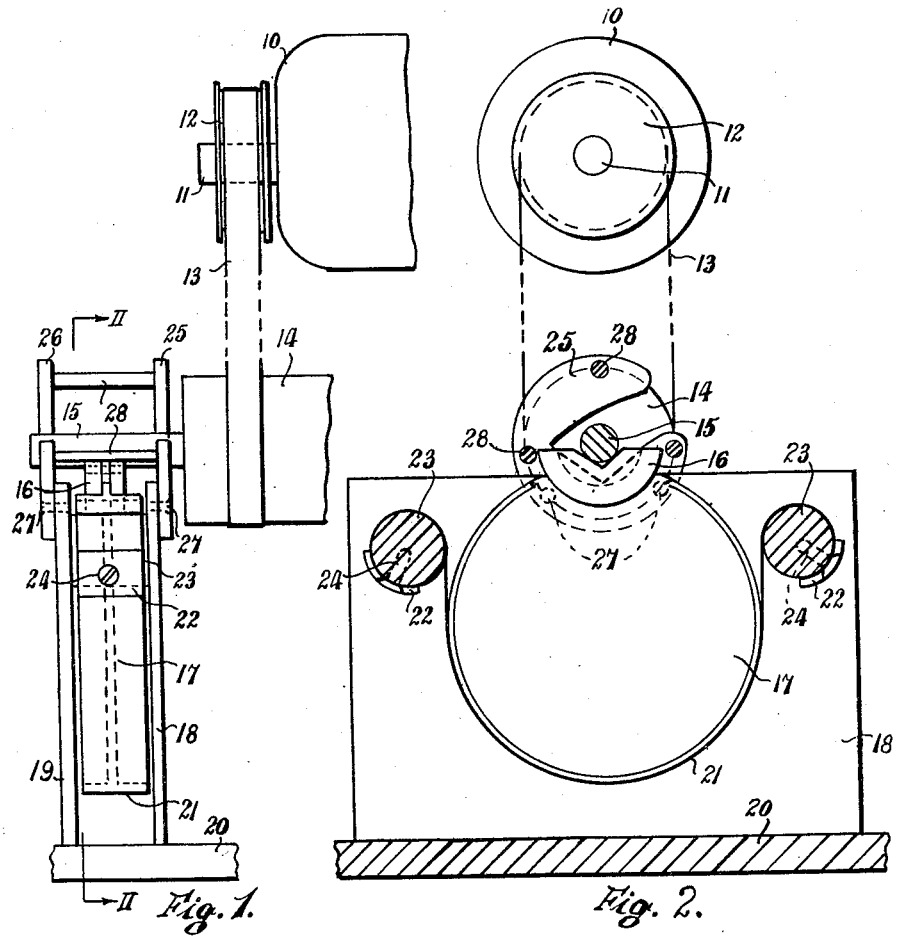
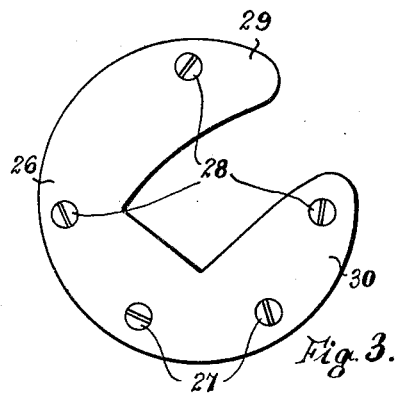
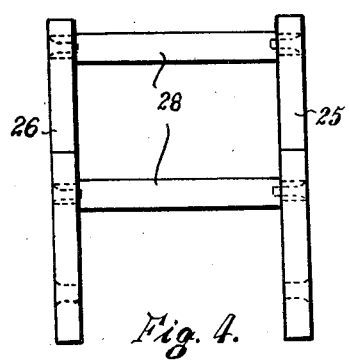
JOHN HORACE TOWNSHEND
INVENTOR
By Richardson and David
his ATTYS Patented Oct. 31, 1950

2,527,898

UNITED STATES PATENT OFFICE 2,527,898

BEARING PROTECTOR FOR DYNAMIC BALANCING MACHINES

John Horace Townshend, Wells, England, assignor to Scophony Limited, London, England, a company of Great Britain Application October 19, 1948, Serial No. 55,309
In Great Britain October 23, 1947

5 Claims. (Cl. 73—66)

1

This invention relates to dynamic balancing machines of the type including a base carrying cradles upon which a body to be balanced can be supported in suitable half-bearings at two or more points for rotation about a horizontal axis, the cradles being adapted for rocking movement relatively to the base in a direction perpendicular to said axis. Measurements of the magnitude and phase of the rocking movement occurring when a body is rotated in the cradles enables the magnitude and position of any dynamic unbalance in the body to be determined. The term half-bearing is intended to include any bearing into which a body can be inserted in a direction perpendicular to its axis of rotation and that will support the body and locate its axis of rotation.

When such a machine is used by unskilled or semi-skilled labour, there is a risk of damage to the means by which the cradles are supported relatively to the base, owing to the bodies under test being inserted into their bearings and removed from these bearings too roughly. The invention has for its principal object to provide means for protecting the cradle supporting means so as to make the machine better adapted to prolonged handling by unskilled or semi-skilled labour.

According to this invention, in a dynamic balancing machine of the type specified, protective means are provided to constrain a body which is to be placed in the bearings to motion in a direction inclined to the vertical and horizontal for at least a part of its travel close to the bearing.

Such protective means may comprise, in association with each bearing, a slotted member fixed to the base, the slots having at least a part thereof inclined to the vertical and horizontal, and being of shape and dimensions such as not to interfere with the said rocking movement. The direction of inclination of the slot is preferably downward towards the bearing.

An embodiment of the invention will be described with reference to the accompanying drawing wherein:

Figure 1 is a view in front elevation of a part of the embodiment,

Figure 2 is a view in sectional side elevation on the line II—II in Figure 1,

Figures 3 and 4 are enlarged views of a detail of Figures 1 and 2 in side and front elevation respectively.

A dynamic balancing machine as shown in Figures 1 and 2 comprises a motor 10 having a spindle 11 and a pulley 12. A belt 13 co-operates with the pulley and a body 14 to be balanced and serves to rotate the body about its axis, a portion 15 of the body of reduced diameter being supported in half-bearings 16 (only one of which is shown). Each bearing is attached to a cylindrical cradle 17 which is supported between two parallel plates 18 and 19 which are attached to a base 20 and spaced apart by two cylindrical bars 23. The support for the cradle consists of a metal strip 21 passing beneath the cradle and held at its ends by clamping saddles 22 fixed to the bars 23 by screws 24. The cradle mounting shown is described in more detail in the specification of patent application Serial No. 53,550.

The bearing and cradle are capable of oscillatory movement in the plane of the paper in Figure 2, the amplitude and phase of this movement being dependent upon the magnitude and location respectively of any dynamic unbalance present in the body. The required measurements of amplitude and phase may be made by suitable mechanism, which may comprise a dynamic transducer, attached to the cradle.

Protective means provided for each bearing comprise two discs 25 and 26 fixed to plates 18 and 19 respectively by screws 27. Spacing bars 28 may be fixed between plates 25 and 26. Each of the discs 25 and 26 has formed in it a slot of shape and dimensions such that it will not interfere with the rocking movement of the cradle and body. The slot is bounded by two tongues 29 and 30 (Figure 3). Tongue 29 prevents entry of a body 14 in a vertical direction and tongue 30 prevents entry in a horizontal direction. The body must be brought to the mouth of the slot before it can fall or roll into the bearings. The vertical and horizontal components of the impact of the entering body with the bearings can thus be reduced to safe values so that such impact will not injure the bearing, the cradle support or the mechanism attached to the bearing. Moreover, the body must enter and leave the bearings with its axis of rotation substantially horizontal, the movement being largely in a direction perpendicular to this axis. The risk of applying undesirable twists to the bearings is thus much reduced.

I claim:

1. A dynamic balancing machine for use in balancing a body, said machine comprising a base, a cradle to support and define a horizontal axis of rotation of said body, means to support said cradle for rocking movement relatively to said base in a direction perpendicular to said axis of rotation and protective guide means located adjacent to said cradle to constrain said body, during insertion thereof into said cradle, to motion in a direction inclined to the horizontal and vertical.

2. A dynamic balancing machine according to claim 1, wherein said protective means comprise a slotted member fixed to said base and positioned to accommodate a part of said body within the slot thereof and to permit said rocking movement, said slot having boundaries inclined to the vertical and horizontal over at least part of their length.

3. A dynamic balancing machine according to claim 1, wherein said protective means comprise a slotted member fixed to said base and positioned with upper and lower boundaries of the slot above and below said axis of rotation and inclined to the vertical and horizontal over at least part of their length.

4. A dynamic balancing machine according to claim 1, wherein said protective means comprise an upper and a lower lug fixed to said base, defining a space therebetween to receive the body and projecting at an inclination to the vertical and horizontal above and below the said axis respectively.

5. A dynamic balancing machine for use in balancing a body, said machine comprising a base, a cradle, a half-bearing fixed to said cradle for supporting and defining the axis of rotation of said body, means to support said cradle for rocking movement relatively to said base in a direction perpendicular to said axis, guide means located adjacent to said cradle to prevent insertion of said body into said half-bearing from one side of a vertical plane through said axis and including an upper and a lower lug projecting upwardly upon the other side of said vertical plane, said upper lug projecting above said axis and said lower lug projecting at least substantially to a horizontal plane through said axis.

JOHN HORACE TOWNSHEND.

REFERENCES CITED

The following references are of record in the file of this patent:

UNITED STATES PATENTS

| Number | Name | Date |
|---|---|---|
| 2,123,443 | Taylor | July 12, 1938 |
| 2,201,369 | Hem | May 21, 1940 |